United States Patent Office 3,200,042
Patented Aug. 10, 1965

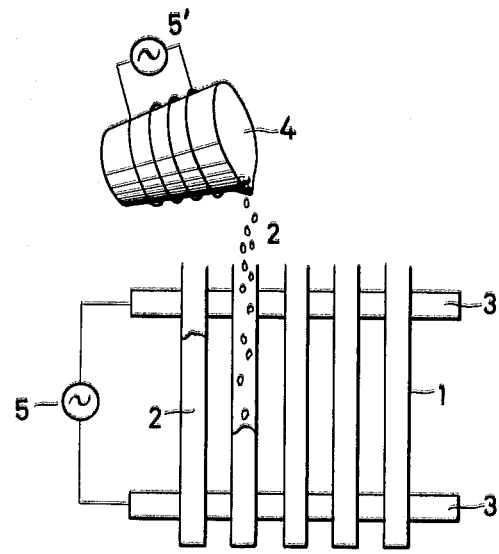
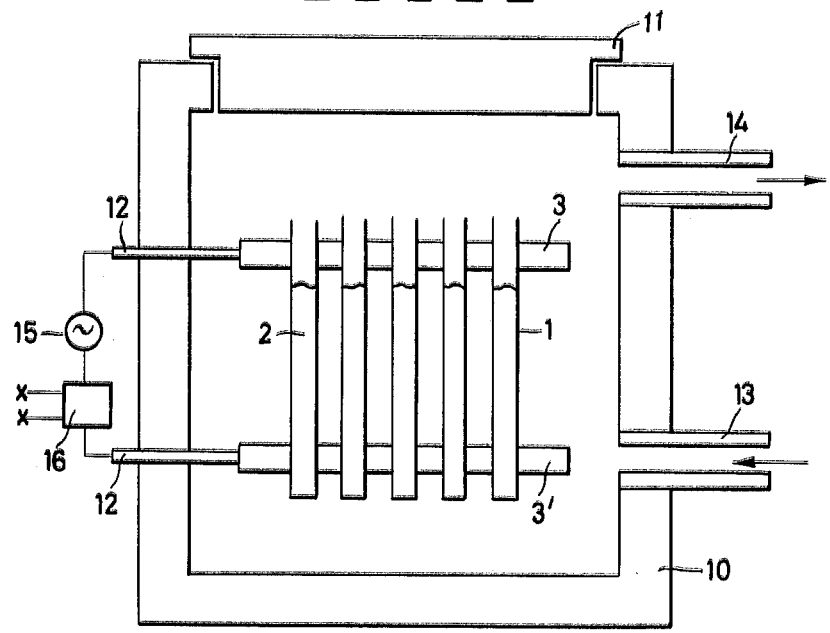

3,200,042
METHOD FOR OPERATING FUEL ELEMENTS OF AN ATOMIC REACTOR AND FOR MANUFACTURING SUCH ELEMENTS
Harry N. Schludi, Munich, Germany (125 Elouera Road, Crouulla, New South Wales, Australia)
Filed Mar. 29, 1961, Ser. No. 99,121
Claims priority, application Germany, Apr. 14, 1960, Sch 27,744
2 Claims. (Cl. 176—21)

The invention relates to a method for operating fuel elements of atomic reactors and to a method for manufacturing such fuel elements.

The fuel elements of heterogeneous atomic reactors consist of an outer jacket of the fuel element, the so called cannings, and of the fissionable material which is contained in the cannings. The cannings can be conventional metal tubes and particularly beryllium tubes. The fissionable material can consist of uranium, plutonium or alloys or compounds of the same.

It is desirable to operate the fuel elements of a reactor at as high a temperature as possible in order to obtain good thermal efficiency. However, operation of the fuel elements at elevated temperatures is limited by mechanical stresses developed in the cannings as a result of differences in thermal expansion of the cannings and of the fissionable material. This is particularly true if changes of phase of the fissionable material prevail, such that the cannings are subject to breaking hence causing the outflow of radioactive material. The cannings undergo mechanical or thermal stresses if the cannings containing the enclosed fissionable material are raised from room temperature to the high operating temperature when the reactor is started or if the cannings are cooled down from the operating temperature to the room temperature when the reactor is switched off.

It is an object of the invention to avoid conditions in which the fissionable material contained in the cannings has to run through large intervals of temperature.

The invention provides that, for operating the fuel elements of an atomic reactor comprising cannings containing fissionable material, heat is supplied by external sources of energy to the fuel elements if the power of the reactor is decreased or switched off, for the purpose of avoiding differences in contraction of the fissionable material and the cannings.

Correspondingly, according to the invention, when the fuel elements of an atomic reactor are manufactured and the said elements are introduced into the reactor, heat is supplied to the fuel elements from external sources of energy when the fissionable material is fed into the cannings and subsequently until the cannings are introduced into the reactor such that undesired differences of expansion of the fuel material and the cannings is avoided.

It is advisable to make the supply of energy to the fuel elements dependent on the power of the reactor in such a way that the range of temperature desired for the fissionable fuel elements neither is exceeded nor is fallen short of. If the power of the reactor is not sufficient for maintaining the desired temperature of the fissionable fuel material, the fuel elements are maintained at the necessary temperature level by supplying heat from external sources such that the cannings are not damaged by becoming cold.

The fissionable material similarly is fed into the cannings at a sufficiently high temperature when the fuel elements are manufactured and the fuel elements are maintained at this temperature by using appropriate means until the operation of the reactor is started.

The invention can be carried out in the following way:

The fissionable fuel material consists of metallic uranium (enriched uranium or natural uranium) and the cannings consist of a material of sufficiently high melting point; the operating temperature might be above the gamma-phase change point for uranium. Uranium-metal thus is fed into the cannings at a temperature of above 772° C. and the cannings then are maintained at a temperature which is above the gamma-phase change point but below the melting point of uranium. The heating by external means is continued until the fuel element is introduced into the reactor, wherein the power of the reactor is then related to the fuel elements in such a way that the level of temperature which is desired for the fuel elements is maintained above the gamma-phase changing point.

When the reactor is switched off or a great reduction of power occurs the external heating means is started again in order to avoid destroying the fuel elements due to cooling thereof and to phase change of the fissionable material. It is also possible to feed liquid uranium or plutonium into the cannings and wherein the latter is constituted of a material having a sufficiently high melting point. The fed liquid then is kept in the liquid state until the operation of the reactor is started. The reactor which is operated with such fuel elements has to be coupled to the fuel elements with respect to its power in such a way that the liquid state of the fissionable liquid is maintained during the entire operation. It is evident that a maximum temperature depending on the material of the cannings is not to be exceeded.

The invention therefore seeks to increase the maximum temperature of operation of the fuel element, which heretofore was restricted by the thermal stresses of the material of the cannings. The cooling medium thus can be operated at a higher temperature level and the thermal efficiency thus is improved.

The invention is described in connection with the accompanying drawings wherein:

FIG. 1 is a side view showing the filling of cannings with the heated fissionable material, and FIG. 2 shows the fuel elements supported in a reactor.

The fuel elements consist of cannings 1 filled with fissionable material. The cannings 1 are interconnected by connecting rods 3, 3' such that a structural unit comprising a plurality of cannings 1 results. The cannings 1 consist of metal tubes which can be heated by electrical current supplied by a source of current 5, 15 connected with the rods 3, 3'. In FIG. 1 can be seen a bucket 4, which is heated by a heating coil connected to a source of current 5, and which is used to feed heated fissionable material into cannings 1. In FIG. 2 the cannings are shown installed in a reactor 10. Current conducting leads 12 are passed through the wall of the reactor 10 and are connected to a source of current 15 and serve the purpose of conducting the current to the rods 3, 3' for heating the fuel elements. 16 is a control device which increases the current supplied to the fuel elements by the source of current 15 in dependency of the temperature of the reactor if the power of the same is reduced.

13, 14 are respectively the inlet and the outlet for a liquid material serving the purpose of moderating and cooling, e.g. of heavy water.

11 is the cover of the reactor which, when opened, allows to introduce the unit consisting of the preheated fuel elements into the reactor. The fuel elements also can be maintained at the desired temperature level when being operated in the reactor by energy which is derived from fission of atoms or external sources of energy or both.

I claim:

1. In a method of operating a reactor employing a fuel element constituted by a canning containing fissionable material and operating at a predetermined temperature, the steps of feeding preheated fissionable material into said canning at a temperature substantially equal to the operating temperature of the fissionable material and controllably heating the canning in said reactor from a source external thereof to maintain the temperature of the fuel element substantially constant and at said operating temperature for all magnitudes of power output of the reactor, sufficient heat being furnished to the fuel element from the external source to prevent phase change of the fissionable material.

2. In a method of operating a reactor employing a fuel element having a canning adapted for containing fissionable material, the steps of initially feeding preheated fissionable material into said canning, the fissionable material being uranium which is supplied to the canning at a temperature above the gamma phase point and in a particular phase state, regulating the temperature of the canning from an energy source external of the reactor to initially maintain the canning at a temperature corresponding to that of the initially supplied fissionable material and thereafter to maintain the canning and the fissionable material therein within a particular temperature range for all magnitudes of power delivered by the reactor, sufficient heat being furnished to the canning to maintain the uranium in the particular phase state.

References Cited by the Examiner

Holden: Physical Metallurgy of Uranium, September 1958, pub. by Addison-Wesley, pages 43, 140, 192.

Grainger: Uranium and Thorium, 1958, published by Geo. News, Ltd., London, pages 84 and 155.

Harrington et al.: Uranium Production Technology, pub. by Van Nostrand, Princeton, N.J., pages 300, 338 and 339.

CARL D. QUARFORTH, *Primary Examiner.*

OSCAR R. VERTIZ, *Examiner.*